J. R. MORFORD.
COVERING FOR BOTTLES, JARS, OR OTHER VESSELS.
APPLICATION FILED MAR. 20, 1911.
1,149,532.
Patented Aug. 10, 1915.
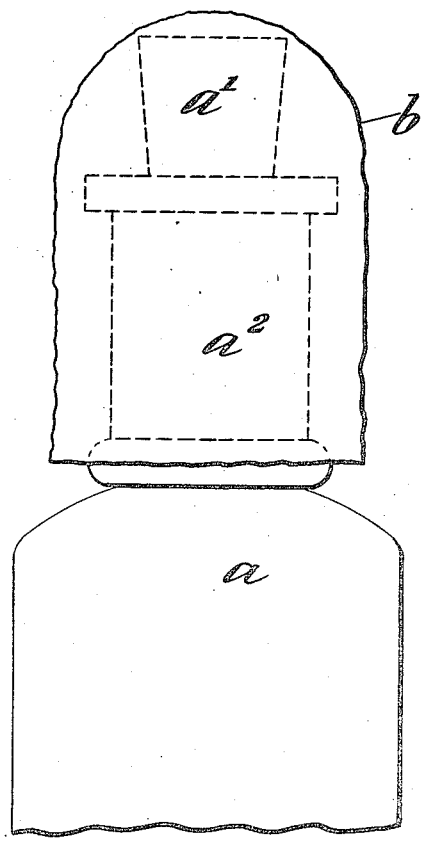
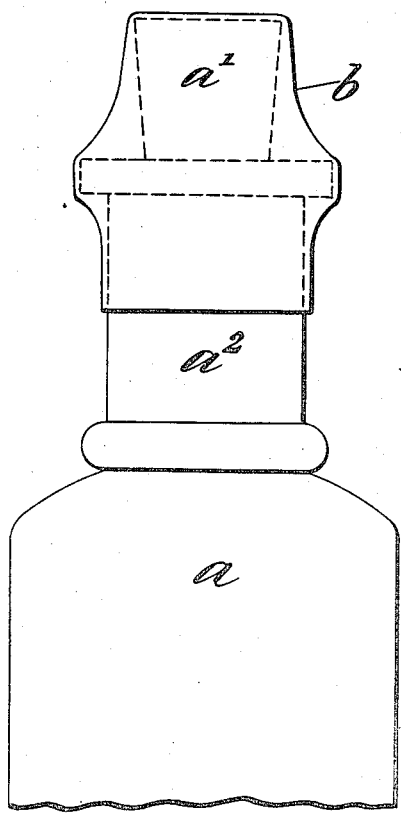

UNITED STATES PATENT OFFICE.

JAMES RIPPON MORFORD, OF LONDON, ENGLAND, ASSIGNOR TO THE VISCOSE DEVELOPMENT COMPANY LIMITED, OF LONDON, ENGLAND.

COVERING FOR BOTTLES, JARS, OR OTHER VESSELS.

1,149,532.   Specification of Letters Patent.   Patented Aug. 10, 1915.

Application filed March 20, 1911. Serial No. 615,696.

*To all whom it may concern:*

Be it known that I, JAMES RIPPON MORFORD, a subject of the King of Great Britain, residing at 11 Queen Victoria street, in the city of London, England, works manager, have invented certain new and useful Improvements in Coverings for Bottles, Jars, or other Vessels, of which the following is a specification, reference being had to the accompanying drawings, illustrating my invention, in which—

Figure 1 is a side elevation of a portion of a bottle and illustrating the initial condition of the cap, and Fig. 2 is a similar view showing the cap after it has given up its water of hydration and has shrunk over the stopper and neck of the bottle.

A method of sealing bottles has been proposed and described by applying tubular or conical capsules composed of hydrated cellulose, the capsule being placed loosely over the neck of the vessel to be sealed, and exposed to the air shrinks or contracts by reason of the loss of water of hydration of the cellulose hydrate; in shrinking, the capsule fastens itself to the neck and any projecting surfaces such as those of the cork or stopper, and in the final condition is under considerable tension on its free surfaces. It now constitutes a transparent seal, rigidly secured by the automatic process described.

According to the present invention certain esters of cellulose or of cellulose derivatives are adapted for similar application, namely those esters which are soluble in liquids perfectly miscible with water and can be separated from their solution in such a liquid as a continuous film, in combination with a large proportion of water of hydration.

By spreading the solution of the ester on a suitable surface of the required shape and then bringing the coated surface into contact with water or an aqueous solution of a salt or of another substance having no injurious effect upon the ester, there is obtained a correspondingly shaped film or layer of hydrated ester of cellulose or of cellulose derivative constituting a hollow cap or article adapted for useful purposes. For example, a solution of cellulose acetate in glacial acetic acid spread upon a resistant surface, and then exposed to water, is coagulated to a transparent hydrated film, composed of cellulose acetate 17–20 per cent., and water of hydration 83–80 per cent. These percentages are merely given as examples.

To prepare capsules or covers of suitable shape, glass tubes resembling test tubes may be dipped into the solution of the acetate containing 10–14 per cent. or other suitable proportion, of dissolved acetate, or a suitable solution of another ester of cellulose or of cellulose derivative having the aforesaid properties. The tubes are raised and drained, and then inverted so that the viscous solution accumulated toward the bottom of the tubes may flow back and distribute itself more evenly over the external surface of the tubes. These are then plunged into a bath of water, or an aqueous solution such as a solution of a salt or neutral body such as glycerin. The solution of the ester is rapidly coagulated and the capsules thus formed are stripped from the tubes and preserved in contact with water in the hydrated condition. For use they are removed and placed loosely on the neck of the vessel to be sealed or on the stopper, handle, or other object to be covered. Instead of a tubular shape the capsule or cover may be given any desired shape such as a rectangular, oval or polygonal form by using correspondingly shaped surfaces on which the solution of the ester is spread. By mixing an inert solid with the solution of the ester the capsule or cover may be made opaque; or it may be colored by mixing the solution with a pigment or a soluble dyestuff.

It is evident that if the hydrated material is allowed to shrink on a surface from which it can readily be detached it may then constitute a hollow article capable of useful applications. If two such articles of similar shape are made they may be fitted together to form boxes or cases. If the coated article be a ring or tube the correspondingly shaped film of hydrated ester may be applied, for instance to a jar or the like around the junction of the lid with the jar so that when the ring or tube has shrunk it will seal the lid in place.

One essential and important difference between the articles described in the opening paragraph of this specification and those which are formed by my process, is that the latter are relatively water proof, although a prolonged immersion in water may produce a slight induration and softening, whereas the former are not water proof.

In the accompanying drawings illustrating the manner of carrying out my invention, $a$ designates the body of a bottle, $a'$ the usual stopper inserted in the neck $a^2$, and $b$ is a hollow cap formed according to the invention. In Fig. 1 the cap is represented as being in a wet condition and loose upon the stopper $a'$, while Fig. 2 represents the cap in its dry and shrunk condition securely clasping the stopper and bottle neck.

Having thus described the nature of this invention and the best means I know of carrying the same into practical effect, I claim:—

1. A hollow article or cap, consisting of wet hydrated ester of cellulose or ester of cellulose derivative, adapted to be placed upon a substantially similarly shaped surface to give up its water of hydration and shrink to become substantially the exact shape of said surface, substantially as described.

2. A hollow article or cap, consisting of wet hydrated ester of cellulose or ester of cellulose derivative, adapted to be placed upon a substantially similarly shaped surface to give up its water of hydration, shrink and become water proof, and which in shrinking has assumed substantially the exact shape of said surface, substantially as described.

In testimony whereof I have signed my name to this specification in the presence of two subscribing witnesses.

JAMES RIPPON MORFORD.

Witnesses:
JOSEPH R. MILLARD,
OLIVER IMRAY.